Patented Jan. 17, 1933                                                                                      1,894,926

UNITED STATES PATENT OFFICE

JOSEF VARGA, OF BUDAPEST, HUNGARY, ASSIGNOR, BY MESNE ASSIGNMENTS, TO THE FIRM OF DEUTSCHE GOLD- UND-SILBER-SCHEIDEANSTALT VORMALS ROESSLER, OF FRANKFORT-ON-THE-MAIN, GERMANY, A CORPORATION OF GERMANY

PROCESS FOR THE DESTRUCTIVE HYDROGENATION OF CARBONACEOUS SUBSTANCES

No Drawing. Original application filed October 24, 1928, Serial No. 314,849, and in Germany June 12, 1928. Divided and this application filed April 24, 1930. Serial No. 447,105.

This application is a division of my earlier application S. N. 314,849 which has now become Patent No. 1,852,988 dated April 5, 1932. This application is directed to the use of tungsten catalysts in a process of destructive hydrogenation resulting in increased yields because of the utilization of the "Varga effect". In the use of tungsten catalysts, it differs from the molybdenum catalysts which are protected by Patent No. 1,852,988.

The invention relates to the treatment of carbonaceous substances of various kinds with hydrogen, or gases containing hydrogen or yielding hydrogen under the reaction conditions, in which the initial substances are converted into valuable, mostly liquid, products by hydrogenation, reduction, or decomposition, or, if desired, by a plurality of these operations. The following are examples of initial substances suitable for the destructive hydrogenation: fossil fuels such as mineral coal, brown coal, wood, peat, lignite etc; the products or constituents of the products obtained from these substances by distillation, extraction, hydrogenation, cracking, splitting up (decomposition) and other kinds of treatment, such as the products from the carbonization of wood, tar-oils, brown coal-tar-oils, for example such as contain paraffins and unsaturated compounds and the like; and, again, the further transformation products obtained, for example, by hydrogenation, cracking etc. Other initial substances are, for example, mineral oils and bitumens of various kinds such, for example, as petroleums, shale oils, asphalt, mineral wax cellulose, materials containing cellulose, materials containing lignin and the like, as well as products obtained therefrom.

The "hydrogenizing" treatment of such initial substances has hitherto mostly been carried out by subjecting them to the action of hydrogen, or gaseous mixtures containing hydrogen, under the usual pressure or a high pressure and at a high temperature in the absence or presence of catalysts. Sulfur and sulfur compounds have hitherto functioned in this connection as troublesome catalyst poisons and, consequently, sulfur-containing starting materials, e. g. tar oils, have had to be subjected before being hydrogenated to a troublesome and costly desulfurizing process. Again, labor has been expended in the direction of discovering "sulfur-proof" catalysts which eliminate the detrimental effects of sulfur and sulfur compounds.

Exhaustive experiments have now led to the surprising discovery that by using an excess of hydrogen or gases containing hydrogen in excess or yielding hydrogen in excess under the conditions of the reaction, sulfuretted hydrogen, when used in correct quantities, has in cooperation with quite definite other catalysts, a very favorable catalytic effect upon the reaction when the reaction is carried out under high pressures and at a high temperature. Instead of sulfuretted hydrogen, substances which, under the given reaction conditions, are adapted to form sulfuretted hydrogen may be employed. Substances yielding sulfuretted hydrogen that come into consideration under the given working conditions are, inter alia, readily decomposable sulfur compounds, for example, alkali- or alkaline earth sulphides: also similarly readily decomposable compounds containing the sulfur in organic combination for example thiophene; and, further, carbon bisulfide and, above all, sulfur itself.

If the treatment of the initial materials, for example, substances of the kind mentioned above, with hydrogen be carried out in the presence of suitable quantities of sulfuretted hydrogen or suitable quantities of substances producing sulfuretted hydrogen and in the simultaneous presence of tungsten or tungsten compounds, advantages are obtained which are unobtainable with tungsten compounds, by themselves. In particular, it is possible to prepare in this way technically pure hydrocarbon mixtures which can be used directly, i. e. without further refining, as motor fuels, lubricating oils, solvents, starting materials for the organic industries and so forth. Such products that are obtainable by the present process owe their valuable properties to the fact that they consist almost entirely of saturated aliphatic, aromatic and hydro-aromatic hydrocarbons whilst they are practically free from compounds containing oxygen, sulfur or nitrogen and contain only quite small quantities of unsaturated hydrocarbons.

It is important for the success of the process that the sulfur during the reaction should be available in the form of sulfuretted hydrogen. It has, for example, been found that the combination of sulfur with heavy metals, for example with metals of the iron group in the form of their sulfides, further the complete combination of sulfur with tungsten itself in the form of tungsten sulfides, prevents the realization of the desired catalytic result. Thus if, for example, tungsten acid and elementary sulfur are used as catalysts, it is necessary, for obtaining a favorable action, to use more sulfur than is necessary for the formation of the compound $WS_2$ or $WS_3$. If the operation is carried out in new reaction vessels, for example, of iron, the walls of which are still capable of combining with appreciable quantities of sulfur, this behaviour must be taken into account by increasing the quantity of sulfur or sulfur compounds added.

The quantities of sulfuretted hydrogen favorable to the reaction are dependent among other things upon the nature particularly upon the chemical properties of the material to be treated and the kind and amount of the catalysts employed in addition to the sulfuretted hydrogen. Generally, these quantities range between 1 and 15 parts of sulfuretted hydrogen to 100 parts of the initial material. When employing, for example, 2 parts of tungstic acid to 100 parts of the starting material, 1 to 15 parts of sulfuretted hydrogen have been shown to be advantageous. In many cases, amounts of 1 to 10 parts, preferably, 1 to 6 parts have proved to be advantageous. The most suitable proportions within these limits of 1 to 10 parts must be specially selected for each initial substance. For example, in the case of beechwood tar-oil the presence of 4 per cent of sulfuretted hydrogen during the reaction proved to be advantageous, whilst in the case of brown coal producer tar-oil the desired effect was obtained in the presence of 1.5 per cent of sulfuretted hydrogen. Less favorable results were obtained on going below or exceeding these quantities.

When treating sulfur-containing initial materials, for example, tar oils, the organically combined sulfur, which is adapted to produce sulfuretted hydrogen under the conditions stated, must be taken into account. Thus in these cases the added quantity of, for example, sulfur must be such that the total quantity of the sulfuretted hydrogen available during the reaction falls within the limits within which the effects favorable to the reaction are exerted.

The favorable action of sulfuretted hydrogen consists as has been discovered, in the fact that it promotes the combination of hydrogen in the case of olefines as well as in the case of unsaturated cyclic hydrocarbons, and at the same time promotes also the splitting up of the saturated hydrocarbons formed. As a result, the formation of valuable products, chiefly of low boiling point and liquid, is promoted and undesired splitting up actions, for example, with the deposition of coke and the formation of gas, is counteracted. The peculiar action of the sulfuretted hydrogen arises, for example, in a particularly advantageous manner in the hydrogenation of pitches and tar-oils, as, for example, beechwood tar-oil or brown coal tar-oil. If such starting materials are hydrogenated by employing the catalysts hitherto usual, the hydrogenation products then contain always more or less large quantities of phenols, from which it is concluded that certain constituents of these starting materials prevent the phenol reducing action of the catalysts which would otherwise be good. Upon the combined use of sulfuretted hydrogen with tungsten compounds, the reduction of phenol is, on the other hand, extraordinarily promoted owing to the presence of the sulfuretted hydrogen, so that the production of products free from phenol is effected.

As mentioned above, the best effects of the sulfuretted hydrogen occur within certain limits, dependent upon the starting materials and the working conditions. Upon exceeding the limits, the favorable actions do not occur, while undesired effects, as, for example, polymerization actions, may occur. Too great quantities of sulfuretted hydrogen should also be avoided, because apart from polymerization effects and the like, other disadvantages also may occur, for example, with relation to the removal of sulfur from the final gases and regeneration of the sulfuretted hydrogen. The further examples given below serve as a basis for the above explanations.

Further experiments have shown that the catalytic effects of sulfuretted hydrogen or compounds producing sulfuretted hydrogen in conjunction with tungsten compounds—e. g. tungstic acid or tungstates—can be further heightened by the co-operation of auxiliary catalysts (activators). Such auxiliary catalysts are, for example, boric acid and other compounds of boron, e. g. borates. The efficacy of these auxiliary catalysts is especially evident when used in the treatment of paraffins and unsaturated compounds or products derived from these substances, for example, brown coal tar-oils rich in paraffin. Certain chromium compounds may, for example, be employed as auxiliary catalysts, as, for example, chromium hydroxide. Use of these auxiliary catalysts has been proved desirable for example in the production of products rich in paraffins. The efficacy of the auxiliary catalysts is, among other things, dependent upon the kind of starting material and the kind and the quantity of the catalysts employed.

The catalysts or auxiliary catalysts can with advantage be introduced on carriers of suitable material.

In carrying out the invention, the initial substance may, for example, in discontinuous working, be heated under pressure with excess of hydrogen or gases containing hydrogen and the catalysts in a suitable apparatus, for example in a stirring or rotating autoclave. The most favorable reaction temperatures generally lie between 250° and 700° C., preferably between 350° and 550° C., and the pressures employed above 50 atmospheres, preferably between 100 and 500 atmospheres. The reaction is generally completed within an hour. The hydrogen or the reducing gaseous mixture must be employed in fairly large excess, for example in such quantities that the hydrogen present amounts to two or three times the quantity used up in the destructive hydrogenation. The most suitable proportions are best determined by experiment. It may be taken as a general rule that higher working temperatures require larger amounts of hydrogen in order to press back the dehydrogenation. Moreover, the conditions especially the proportions, should be so chosen that the highest pressure attained during the reaction is not less than 100 atmospheres. During the heating up process the internal pressure rises to a maximum value (maximum pressure), which as a rule is attained when the maximum temperature is reached. Hereafter, the temperature remaining constant, the pressure again falls. The maximum pressure has been found to be a characteristic for the course of the reaction. When the reaction has been completed the gases and vapours are allowed to escape and, if desired, are condensed in various fractions.

In continuous working the initial substances, for example, in the form of gases, vapours, liquids or atomized liquid or solid substances, are passed together with suitable amounts of hydrogen or gases containing hydrogen and of sulfuretted hydrogen through an autoclave filled with the solid catalyst and heated to the reaction temperature. Generally a working pressure of 100 to 250 atmospheres is necessary in this case. Care should also be taken in this case that the proportions of starting material, hydrogen and the sulfuretted hydrogen, as well as the velocity of the stream of the whole gas and vapour mixture through the reaction chamber, remain constant during the reaction or that the content of sulfuretted hydrogen is kept during the operation within the limits favorable to the reaction.

*Examples*

(1) A mineral coal distillation tar was heated at 460° for one hour with hydrogen of an initial pressure of 125 atm. in the presence of 8 per cent of tungstic acid. There was obtained 64 per cent of oil having a specific gravity of 0.884 with a content of 43.5 per cent of benzine boiling up to 180°.

(2) The same mineral coal distillation tar was heated at 460° for one hour with hydrogen of an initial pressure of 125 atm. in the presence of 8 per cent of tungstic acid and 3 per cent of hydrogen sulfide. There resulted 66 per cent of oil having a specific gravity of 0.849, of which 53.5 per cent consisted of benzine boiling up to 180°.

(3) The same mineral coal distillation tar was heated at 460° for one hour with hydrogen of an initial pressure of 125 atm. in the presence of 4 per cent of tungstic acid, 4 per cent of molybdic acid and 2 per cent of sulfur. There was obtained 74 per cent of oil having a specific gravity of 0.851, of which 50 per cent consisted of benzine boiling up to 180°.

(4) English mineral coal tar was heated at 460° for one hour with hydrogen of an initial pressure of 125 atm. in the presence of 5 per cent of tungstic acid, 5 per cent of molybdic acid and 8.5 per cent of carbon disulfide. There resulted 61 per cent of oil having a specific gravity of 0.914, of which 38 per cent consisted of benzine boiling up to 180°.

(5) Technical tricresol with a sulfur content of 0.87 per cent was heated at 480° for one hour with hydrogen of an initial pressure of 105 atm. in the presence of 5 per cent of tungstic acid and 2 per cent of sulfur. There resulted 82 per cent of water clear oil with a specific gravity of 0.852, of which 94 per cent distilled over up to 150°.

The benzine obtained in accordance with the aforesaid examples is precipitated in the distillation as a product being neither affected by light nor by air and ready for use without any further purification.

I claim:

The method of destructive hydrogenation of carbonaceous substances, which consists of subjecting the substances to temperatures of from 250° C. to 700° C. and pressures of from 100 to 500 atmospheres, and treating the substances with hydrogen in the presence of tungsten catalyst and hydrogen sulphide, so that hydrogen sulphide is continuously present in optimal amounts between the limits of from 1% to 6% by weight of the carbonaceous substances, so that the action of the tungsten catalyst is improved over the action of tungsten catalysts including tungsten sulphides when used alone, there being continuously present a quantity of hydrogen in minimum amount twice as much as the quantity necessary for the destructive hydrogenation.

In testimony whereof I affix my signature.

JOSEF VARGA.